United States Patent [19]

Schuster et al.

[11] Patent Number: 5,089,237
[45] Date of Patent: Feb. 18, 1992

[54] GAS FILTER WITH CATALYTIC COATING AND A GASTIGHT DOWNSTREAM REGION

[75] Inventors: Hans-Dieter Schuster, Vogstwiesen; Friedhelm Nunnemann, Winnenden; Hans-Joachim Langer, Remseck; Erwin Strohmer, Berglen; Gerd Tiefenbacher, Esslingen, all of Fed. Rep. of Germany

[73] Assignee: Daimler-Benz AG, Fed. Rep. of Germany

[21] Appl. No.: 545,710

[22] Filed: Jun. 29, 1990

[30] Foreign Application Priority Data

Jul. 20, 1989 [DE] Fed. Rep. of Germany ....... 3923985

[51] Int. Cl.⁵ ............................ B01D 50/00; B01J 8/02
[52] U.S. Cl. ...................................... 422/180; 422/222; 422/239
[58] Field of Search .................... 422/180, 222, 239

[56] References Cited

U.S. PATENT DOCUMENTS 4,390,355  6/1983  Hammond et al. .................. 55/523
4,515,758  5/1985  Domesle et al. .................. 423/213.2
4,652,286  3/1987  Kusuda et al. ........................ 55/523

FOREIGN PATENT DOCUMENTS 0277012  8/1988  European Pat. Off. .

Primary Examiner—Douglas W. Robinson
Assistant Examiner—Timothy J. Reardon
Attorney, Agent, or Firm—Evenson, Wands, Edwards, Lenahan & McKeown

[57] ABSTRACT

A soot burn-off filter including a monolithic filter block made of porous ceramic with a multiplicity of channels which extend in the direction of flow of the exhaust gases of a combustion engine. The channels are sealed alternately at the ends by plugs and are separated from one another by porous partition walls. The partition walls are provided with a catalytic coating and have an increased flow resistance in a region at the downstream end of the filter, the partition walls in this region being of gastight design and the catalytic coating of the partition walls ending in a region upstream of the gastight region of the partition walls.

8 Claims, 1 Drawing Sheet

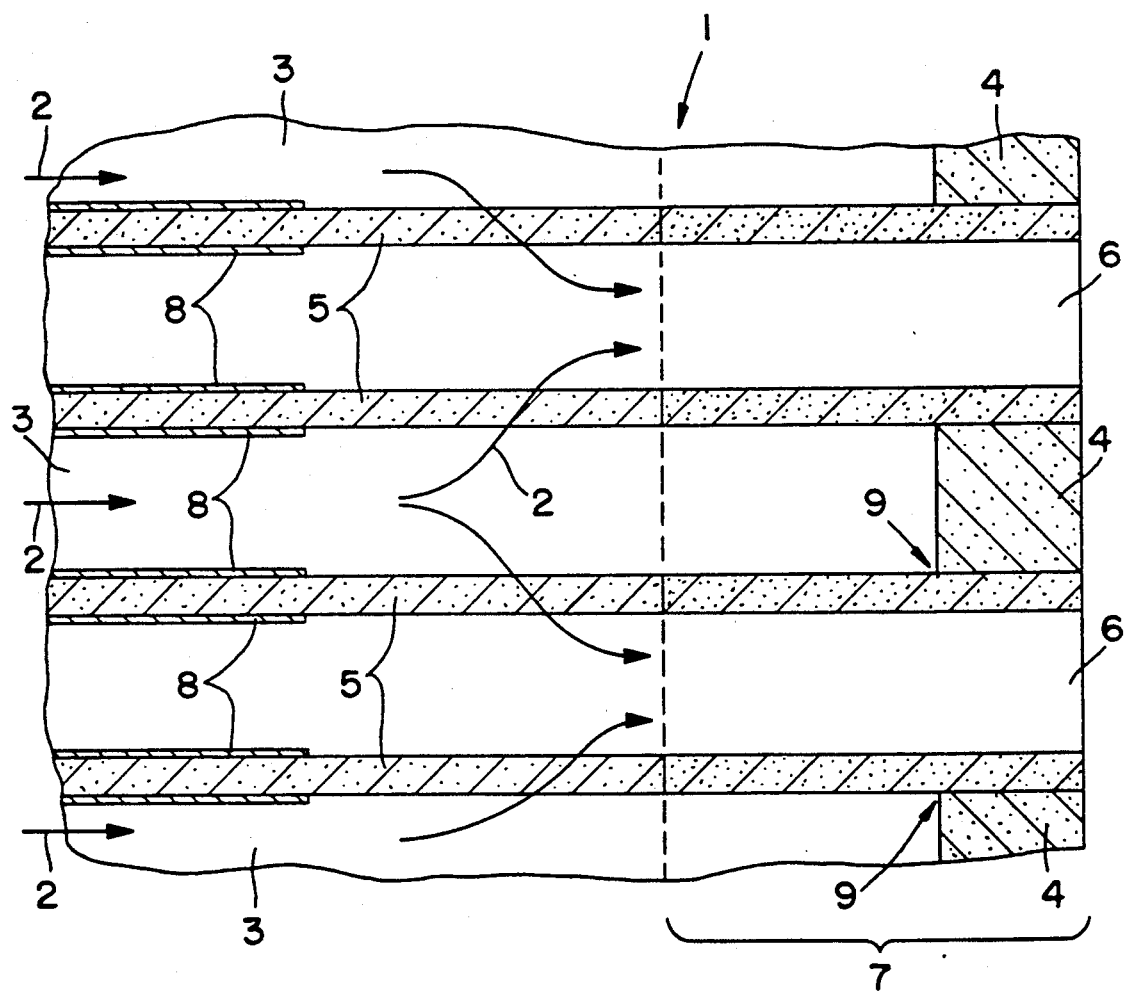

GAS FILTER WITH CATALYTIC COATING AND A GASTIGHT DOWNSTREAM REGION

BACKGROUND AND SUMMARY OF THE INVENTION

The invention relates to a soot burn-off filter a monolithic filter block made of porous ceramic with a multiplicity of channels which extend in the direction of flow of the exhaust gases of a combustion engine, are sealed alternately at the ends by plugs and are separated from one another by porous partition walls, the partition walls being provided with a catalytic coating and having an increased flow resistance in a region at the downstream end of the filter.

Soot burn-off filters customarily comprise a monolithic structure of porous ceramic constructed of mutually parallel, thin-walled channels which, as seen in the direction of flow of the exhaust gases of a combustion engine, run through its entire length. These channels are alternately sealed at their upstream or downstream end in each case. In this arrangement, the channels are often sealed or open, respectively, in the manner of a chessboard pattern, with the result that each channel has an open and a sealed end. A filter of this kind is known, for example, from EU 0 277 012. As the exhaust gases are guided through a filter of this kind they are forced, after entering the channels open on the inlet side, to flow through the porous partition walls between the channels into the channels open on the outlet side. During this process, soot particles which cannot pass through the partition walls accumulate on the partition walls of the channels open on the upstream side. On reaching a certain ignition temperature, which can be lowered by the use of a catalytic coating of the partition walls, and given a sufficient oxygen concentration, the accumulated soot burns off and the filter is regenerated. Since the soot particles principally accumulate in the region in front of the downstream plugs and, during burning free, this region is therefore also subjected to high thermal stress, provision is made in EU 0 277 012 to make the partition walls between the channels more gas-impermeable in this region by means of an additional coating of porous ceramic material. In this way, due to the increased flow resistance in this region and the resulting reduced flow of exhaust gas, fewer particles accumulate and thermal stressing upon burn-off can be reduced.

A disadvantage is that, in this arrangement, due to the flow of exhaust gas still present in the region in front of the plugs, the partition walls and plugs are subject to mechanical abrasion by unburnt particles carried along in the exhaust gas, this occurring in particular at the joint between partition walls and plugs.

Due to the embedding of substances having a high coefficient of expansion in the filter wall, mechanical stresses between wall and plug, which can lead to destructive effects on the filter, furthermore occur in said region in the event of temperature changes. In addition, embedded particles in the filter wall can give rise to chemical reaction with the ceramic material and changes in the material resulting from this.

A further disadvantage consists in the fact that the heat of reaction during the burning free of the filter is kept high in the region in front of the downstream plugs, which is particularly sensitive to the effect of temperature, by the catalytic coating of the partition walls in this region.

It is therefore an object of the invention to improve a soot burn-off filter of the generic type in such a way that the mechanical and thermal stressing of the filter, in particular in the region of the downstream plugs, is reduced.

The object is achieved according to the invention by providing an arrangement wherein the partition walls in the region at the downstream end of the filter are of gastight design, and wherein the catalytic coating of the partition walls ends in a region upstream of the wells region of the partition walls.

In a soot burn-off filter having these exhaust-gas channels which extend through in the direction of flow of exhaust gas and are alternately sealed by plugs, the partition walls between the channels are of gas-impermeable design in the region in front of the downstream plugs. This can, for example, be effected by impregnating the porous ceramic filter material with a medium which seals the pores. In addition, the catalytic coating of the partition walls, which lowers the ignition temperature of the soot particles accumulated in the channels open on the inlet side, ends upstream of the gas-impermeable region. By virtue of these measures, the heat of reaction during the burning of soot in the region in front of the downstream plugs, in which the greatest accumulation of soot particles is usually to be found, is reduced as a result of the local lack of oxygen due to the absence of exhaust-gas flow. The thermal stresses in the ceramic material which occur between the partition walls and the plugs are thus reduced due to the lower temperature and the reduced deposition of substances having a high coefficient of linear expansion in this region.

The region surrounded by gas-impermeable partition walls in front of the downstream plugs serves as an accumulation zone for non-oxidizable particles deposited from the exhaust-gas stream. Since there are no longer any flowing exhaust gases with particles carried along in the exhaust-gas stream in this region, no mechanical abrasion at partition walls and plugs can occur either. The hitherto particularly at-risk joint between partition walls and plugs is in this way protected against particles being wedged in and subsequently eating their way through the ceramic material.

Due to the fact that the catalytic coating of the partition walls already ends upstream of the gas-impermeable region, heat of reaction during the burning free of the filter is in addition kept away from this particularly at-risk region. This measure also prevents particles having a high coefficient of linear expansion which have been deposited between partition walls and plugs from breaking up the ceramic material and detaching the plugs from the partition walls.

To further increase the mechanical strength of the soot burn-off filter, fibrous materials extending in the longitudinal direction of the channels are additionally incorporated into the partition walls.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic sectional view which shows a simplified detail of the downstream end of a soot burn-off filter constructed according to a preferred embodiment of the invention.

DETAILED DESCRIPTION OF DRAWINGS

The direction of flow of the exhaust gases through the filter 1 is indicated by arrows 2. Since the outlet end of the channels 3 is sealed by plugs 4, the exhaust gases entering through the channels, open at the inlet side, are forced to flow across into the channels 6, open at the outlet side, through the partition walls 5 of porous ceramic filter material, particles carried along being filtered out.

In a region 7 at the downstream end of the filter 1, the partition walls 5 are of gastight design, with the result that a flow of exhaust gas no longer occurs in this region and thus no particles which, by their motion, could cause abrasion on the partition walls 5 and the plugs 4 in region 7 are carried along in the exhaust gas flow either. Instead, region 7 serves to collect non-oxidizable particles released from the exhaust gas to the effect of centrifugal force. Upon reaching their ignition temperature, which can be lowered with the aid of a catalytic coating 8 of the partition walls, oxidizable particles are burnt in an exothermic reaction.

Due to the fact that the catalytic coating 8 already ends upstream of the gas-impermeable region 7 of the partition walls 5, the reaction temperature in this region 7 is lowered and the thermal stressing is as a result lower. In particular, the thermal stresses at the joint 9 between partition walls 5 and plugs 4 are reduced. A further reduction of the reaction temperature is achieved by the fact that, due to the absence of exhaust-gas flow, the oxygen concentration in the region 7 in front of the plugs 4, which as a rule is heavily laden with particles, is markedly lower than in the remaining regions of the filter 1. Since there is no longer any exhaust-gas flow at the joints 9 between the partition walls 5 and the plugs 4, no particles can be wedged into these points and eat their way through. Due to the reduced reaction temperature, particles which, in some cases, have relatively large coefficients of linear expansion can no longer break up the ceramic material in this region and detach the plugs 4 from the partition walls 5.

It is possible to make the partition walls 5 in region 7 gas-impermeable in a simple manner by impregnating the partition walls 5 with a medium which closes the pores of the ceramic filter material. Even if the partition walls 5 cannot be made absolutely gastight with the aid of the impregnation procedure, i.e. if the pores are not completely gastight, a degree of gas impermeability can be achieved which is sufficient to almost completely stop the flow of exhaust gas through region 7, the advantages of the invention which have been mentioned thereby coming into effect.

An increase of the mechanical strength of the soot burn-off filter 1 can furthermore be achieved by placing in the partition walls 5 fibrous materials extending in their longitudinal direction.

By simple means, the invention reduces both the mechanical and the thermal stressing of soot burn-off filters to a great extent.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Soot burn-off filter comprising a monolithic filter block made of porous ceramic with a multiplicity of channels which extend in the direction of flow of the exhaust gases of a combustion engine, are sealed alternately at the ends by plugs and are separated from one another by partition walls that have an upstream region and a downstream region, the upstream region of the partition walls being porous, the partition walls being provided with a catalytic coating, wherein the downstream region of the partition walls at the downstream end of the filter are gastight such that neither a flow of exhaust gas nor abrasive particles carried along in the flow of exhaust gas occurs in the downstream region, and wherein the downstream region of the partition walls is free of the catalytic coating.

2. Soot burn-off filter according to claim 1, wherein fibrous materials of ceramic material are placed in the partition walls, extending in the longitudinal direction thereof.

3. Soot burn-off filter according to claim 1, wherein the downstream region of the partition walls are produced by impregnating the latter with a material which seals the pores of the filter material.

4. Soot burn-off filter according to claim 2, wherein the downstream region of the partition walls are produced by impregnating the latter with a material which seals the pores of the filter material.

5. Method of making a monolithic filter block made of porous ceramic with a multiplicity of channels which extend in the direction of flow of the exhaust gases of a combustion engine, are sealed alternately at the ends by plugs and are separated from one another by porous partition walls, the partition walls being provided with a catalytic coating and being gastight in a region at the downstream end of the filter, said method comprising:
    forming a monolithic filter block of porous ceramic with a multiplicity of channels which extend in the direction for flow of the exhaust gases of a combustion engine,
    sealing the channels alternately at the ends by plugs with separation of the channels from one another by partition walls that have an upstream region and a downstream region, the upstream region of the partition walls being porous, the partition walls being provided with a catalytic coating, wherein the downstream region of the partition walls at the downstream end of the filter are gastight such that neither a flow of exhaust gas nor abrasive particles carried along in the flow of exhaust gas occurs in the downstream region, and wherein the downstream region of the partition walls is free of the catalytic coating.

6. Method according to claim 5, wherein fibrous materials of ceramic material are placed in the partition walls, extending in the longitudinal direction thereof.

7. Method according to claim 5, wherein the downstream region of the partition walls are produced by impregnating the latter with a material which seals the pores of the filter material.

8. Method according to claim 6, wherein the downstream region of the partition walls are produced by impregnating the latter with a material which seals the pores of the filter material.

* * * * *